United States Patent
Pescod et al.

(10) Patent No.: US 7,893,395 B2
(45) Date of Patent: Feb. 22, 2011

(54) OPTICAL DELAY LINES

(75) Inventors: Christopher Ralph Pescod, Chelmsford (GB); Andrew James Smith, Chelmsford (GB)

(73) Assignee: BAE Systems plc, London (GB)

( * ) Notice: Subject to any disclaimer, the term of this patent is extended or adjusted under 35 U.S.C. 154(b) by 2654 days.

(21) Appl. No.: 10/167,641

(22) Filed: May 28, 2002

(65) Prior Publication Data

US 2006/0016969 A1    Jan. 26, 2006

(30) Foreign Application Priority Data

May 31, 2001 (GB) .................... 0113766.0

(51) Int. Cl.
*G01J 1/04* (2006.01)
(52) U.S. Cl. ................................. 250/227.12
(58) Field of Classification Search ............ 250/227.12; 333/144; 359/331, 323, 237, 238, 290
See application file for complete search history.

(56) References Cited

U.S. PATENT DOCUMENTS

| 4,959,540 | A | * | 9/1990 | Fan et al. ................. 250/227.12 |
| 5,177,488 | A | * | 1/1993 | Wang et al. .................. 342/167 |
| 5,181,036 | A | | 1/1993 | Miler et al. |
| 5,493,304 | A | | 2/1996 | Lee et al. |
| 5,703,708 | A | * | 12/1997 | Das et al. ..................... 398/102 |
| 6,011,506 | A | | 1/2000 | Li |
| 6,215,941 | B1 | * | 4/2001 | Nagai et al. .................. 385/136 |

FOREIGN PATENT DOCUMENTS

GB    2167574 A    5/1986

* cited by examiner

*Primary Examiner*—Mark Hellner
(74) *Attorney, Agent, or Firm*—Crowell & Moring LLP

(57) ABSTRACT

This invention relates to optical delay lines, particularly to modifying an optical signal passing through an optical delay line. A method of applying a Doppler shift to an optical signal as it passes through an optical delay line is provided, the method comprising the step of progressively altering a property of the optical delay line during passage of the optical signal therethrough such that the time taken for the optical signal to pass therethrough is progressively lengthened or progressively shortened for successive portions of the optical signal. In addition, an optical delay line is provided that may be used in accordance with the above method.

24 Claims, 3 Drawing Sheets

OPTICAL DELAY LINES

This invention relates to optical delay lines, particularly to modifying an optical signal passing through an optical delay line.

The present invention has been developed for use in false target generation and, accordingly, the invention will be described hereinafter in that context. However, it will be clear from the following description and the appended claims that the invention has uses in other fields.

False target generation may be used by an object under radar surveillance as an electronic warfare countermeasure to deceive the radar operator. A typical situation where false target generation may be used is shown in FIG. 1a. Here, a military aircraft has flown into airspace being monitored by a radar station comprising a transmitter and a receiver. The transmitter is used to transmit a radar signal in a narrow beam and the receiver is used to listen for any reflected signal. Typically, the radar signal comprises a pulse train as shown in FIG. 1b: each pulse in the train comprises an oscillating signal.

Any signal reflected by the aircraft of FIG. 1a can be analysed to derive information about the aircraft. The direction of the radar beam corresponds to the direction to the aircraft's position when it reflected the radar signal and by measuring the total time taken for a pulse to travel from the transmitter to the aircraft and back to the receiver, the distance to the aircraft can be determined. Hence, the aircraft's position at the moment of reflection can be deduced. By obtaining a number of positions, the aircraft's direction and speed of flight can be deduced.

In addition, more complex signal analysis can be performed. For example, a radar signal is likely to suffer reflections from different parts of the aircraft such as the nose, wings and tail, so that the reflected signal will have multiple components with a narrow separation in time corresponding to the slightly differing path lengths. Furthermore, any Doppler shift in the frequency of the pulses and of the oscillating signal within each pulse can be measured to gain further information on the aircraft's speed relative to the transmitter and reciever. The magnitude and sign of the frequency shift is proportional to the aircraft's speed and flight direction respectively relative to the transmitter and receiver.

However, some of the above effects can be used to the aircraft's advantage. For example, it is known to monitor any incoming radar signals, record any signal and then return an altered signal to deceive the radar station. A strong "reflection" could be transmitted after a suitable delay: the radar station will then believe the aircraft is further away than it really is. By "reflecting" a number of closely spaced pulses with correctly adjusted amplitudes, the radar station can be fooled into "seeing" a different type of aircraft. In addition, multiple targets may be simulated by "reflecting" a number of pulses with suitable time delays. These delayed "reflections" can be generated using optical delay lines.

A typical optical delay line system is illustrated in FIG. 2. The recorded incoming radar signal is used to modulate the intensity of an optical signal which is then selectively fed into an optical fibre of appropriate length to create a suitable delay. The emergent optical signal can then be converted back to an electrical signal by a photoreceiver for transmitting back as a radar pulse train to the radar station's receiver. Where a false aircraft return is being generated, the recorded signal may be split and passed through several optical delay lines of closely varying time delays before being recombined and transmitted to the radar station's receiver to give the appearance of a different type of aircraft with a different signature of reflections from its surfaces. Moreover, this type of manipulation may be done repeatedly also to present a misleading flight path and flight speed, say to make a fast moving military aircraft look like a slow moving civil airliner.

Unfortunately, current optical delay lines merely add a time delay to the recorded incoming signal before transmitting the "reflected" signal. The "reflected" signal generated by the optical delay line, no matter how complex, carries a Doppler shift that truly reflects the aircraft's speed relative to the radar station. This true Doppler shift will betray the false target generated if a false speed is being generated.

From a first aspect, the invention resides in a method of applying a Doppler shift to an optical signal as it passes through an optical delay line, comprising the step of progressively altering a property of the optical delay line during passage of the optical signal therethrough such that the time taken for the optical signal to pass therethrough is progressively lengthened or progressively shortened for successive portions of the optical signal. By altering an appropriate property of the optical delay line during passage of the optical signal therethrough, the beginning of the optical signal takes a different time to pass through the optical delay line than the end of the optical signal. This leads to a frequency shift in the amplitude modulation of the optical signal thereby simulating the desired Doppler shift.

Optionally, the method comprises progressively lengthening or progressively shortening the optical path length of the optical delay line. This arrangement mimics closely how Doppler shifts are created in reality where the movement of the object relative to an incident signal varies the path length of progressive parts of the signal during the reflection of the entire signal. Accordingly, progressively lengthening the optical path length of the optical signal in the delay line produces a Doppler shift corresponding to a retreating object: on the other hand, progressively shortening the optical path simulates an approaching object.

Alternatively, the method may comprise progressively increasing or progressively decreasing the effective refractive index of the optical delay line. In this way, the time taken for the optical signal to pass through the optical delay line can be changed by keeping the optical path length constant but by adjusting the refractive index of the optical delay line instead. In this way, the speed of the optical signal is varied. Where the refractive index is progressively increased or decreased during passage of the optical signal through the optical delay line, a progressive increase or decrease respectively in the frequency of the optical signal is produced. Hence, by progressively decreasing the refractive index, an approaching object is simulated and by progressively increasing the refractive index, a retreating object is simulated. As will be appreciated, the methods of altering the optical path length of the optical delay line and adjusting the refractive index of the optical path can be used in conjunction rather than in the alternative.

Where the optical delay line comprises a stretchable optical fibre, changing the optical path length may be achieved by progressively stretching and/or progressively relaxing the optical fibre during passage of the optical signal therethrough. By stretching the optical fibre progressively a retreating object is simulated. Conversely, by relaxing the optical fibre, an approaching object is simulated. The rate of stretching or relaxing the optical fibre progressively may be controlled to give the desired apparent speed of approach or retreat. This may be done to match a desired false target path generated as broadly described above. Where a change in refractive index of the optical fibre is desired, this may be achieved for example by illuminating the optical fibre with light, e.g. uv light, of varying wavelengths. Alternatively, a highly dispersive optical fibre could be used in conjunction with a wavelength-tuneable laser: the refractive index of such fibres vary with wavelength and so Doppler shifts can be applied by progressively varying the wavelength of the light sent down the optical fibre.

The method may comprise either only progressively stretching or only progressively relaxing the optical fibre during passage of a pulse of the pulsed optical signal. In this way, an approaching or retreating relative to the radar transmitter may be simulated.

Conveniently, the method may comprise the step of stretching and relaxing the optical fibre periodically, the length of each period being equal to or a multiple or sub-multiple of the repetition period of the pulsed optical signal. This allows the length of the fibre to be reset, a necessary condition as optical fibres cannot be stretched indefinitely. The length may conveniently be reset between pulses or, where this is not possible, may be reset quickly to generate a transient signal outside the normal operating pass bands of radar systems.

Preferably, the method includes applying a varying voltage signal to a piezoelectric transducer to which the optical fibre is rigidly attached thereby to cause the piezoelectric transducer to expand and contract and hence to effect periodic stretching and relaxing of the optical fibre. Preferably, a sawtooth shaped signal is applied to the piezoelectric transducer. This gives a linear stretching and relaxing of the optical fibre, thereby simulating a constant speed of approach or retreat, with a fast reset transition. Conveniently, the repetition frequency of the sawtooth may be equal to or a multiple or sub-multiple of the repetition frequency of the pulsed optical signal.

From a second aspect, the invention resides in an optical delay line for applying a Doppler shift to an optical signal as it passes therethrough, the optical delay line comprising an optical path; frequency shifting means for altering a property of the optical path during passage of the optical signal along the optical path, such that the time taken for the optical signal to pass along the optical path is progressively lengthened or progressively shortened for successive portions of the optical signal; and timing means operable to synchronise operation of the frequency shifting means to the passage of the optical signal through the optical path. Such apparatus may be used according to the method of the first aspect of the invention.

Optionally, the frequency shifting means are operable progressively to lengthen or progressively to shorten the optical path. The frequency shifting means may be operable progressively to increase or progressively to decrease the average refractive index of the optical path.

The optical path may comprise a stretchable optical fibre and the frequency shifting means may comprise stretching means operable progressively to stretch or progressively to relax the optical fibre. Preferably, the optical delay line may further comprise timing means operable to synchronise stretching of the optical fibre to the pulses of a pulsed signal passing through the optical fibre. The timing means may be operable to generate a timing waveform, the timing waveform causing the optical fibre to be stretched and relaxed periodically. Optionally, the timing means, may be operable to generate a timing waveform that causes the optical fibre to stretch only or to relax only during passage of a pulse through the optical fibre. It is currently preferred for the timing means to be operable to produce a timing waveform with a repetition period equal to or a multiple or sub-multiple of the repetition period of the pulsed signal.

Conveniently, the stretching means may comprise a piezoelectric transducer operable to stretch the optical fibre. Optionally, the optical fibre may be wound onto a former, the piezoelectric transducer being operable to vary the dimensions of the former. In either case, the optical fibre may be stretched by applying a varying voltage to the piezoelectric transducer. Preferably, the optical fibre is wound around a substantially cylindrical portion piezoelectric transducer or former. This arrangement is preferred because an optical fibre cannot be bent around tight corners due to both the mechanical properties of the material from which it is made and also due to optical properties giving signal loss around tight bends in the optical path.

Optical fibres that exhibit low signal loss when bent are preferred for the optical delay line, such as gyroscope optical fibres with suitable small bend radius characteristics. Monomode type optical fibres are preferred still further. Using a cylindrical portion of piezoelectric transducer as a former allows the optical fibre to be wound in a compact coil around the former without sharp bends in the optical fibre, although other former shapes are envisaged. Preferably, the optical fibre is directly adhered to the former.

Where a cylindrical piezoelectric former is used, it may be hollow and, optionally, it may be formed by rolling a flat piece of piezoelectric material into a cylindrical shape. This design is advantageous as increasing the voltage applied to the material causes an equal expansion of the outer surface of the cylinder, i.e. the radial expansion is uniform.

From a third aspect, the invention resides in a system comprising an optical source for generating an optical signal, a modulator for modulating the intensity of the optical signal according to an electrical input signal, an optical delay line as described herein above for receiving the modulated optical signal and imposing a Doppler shift thereto and a photoreceiver for converting the modulated and shifted optical signal to an electrical output signal. Optionally, the system includes timing means in the form of a sawtooth generator producing a timing waveform with a sawtooth of varying electrical potential which is applied to stretching means in the form of piezoelectric transducer thereby to cause expansion and contraction of the piezoelectric transducer.

It will be appreciated that the present invention can be used in a number of situations additional to the aircraft radar scenario described with reference to FIG. 1a. For example, it may be used on any type of air, land or sea vehicle where there is a desire to disguise the vehicle's true path or true type. Alternatively, it may be used by a stationary object, say a small buoy, to simulate an imaginary approaching or retreating vehicle or missile. A further application is its use for testing or calibrating a radar system: at present, the use of optical delay lines is used to simulate a fixed target, the delay corresponding to the return-trip distance to the target, thereby removing the need to position and then reposition real targets. However, only stationary targets can currently be simulated: the new system allows moving targets to be simulated thereby allowing the Doppler shift measurements to be tested or calibrated.

In order that the invention can be more readily understood, reference will now be made, by way of example only, to the accompanying drawings in which:

FIG. 1b shows a pulse train of a type commonly used with the radar system of FIG. 1a;

Figure 1A:
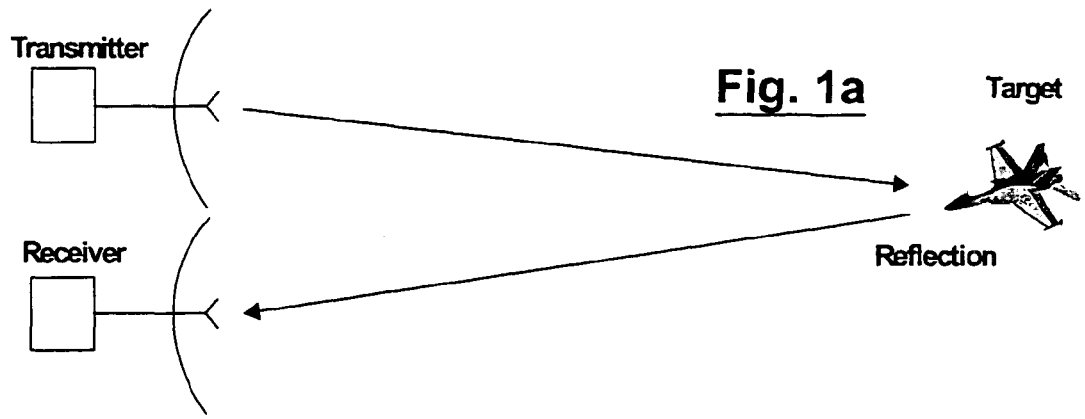
FIG. 1a is a simplified sketch of a radar system.
Figure 1B:
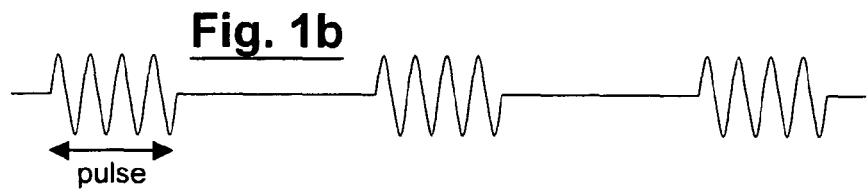
Figure 2:
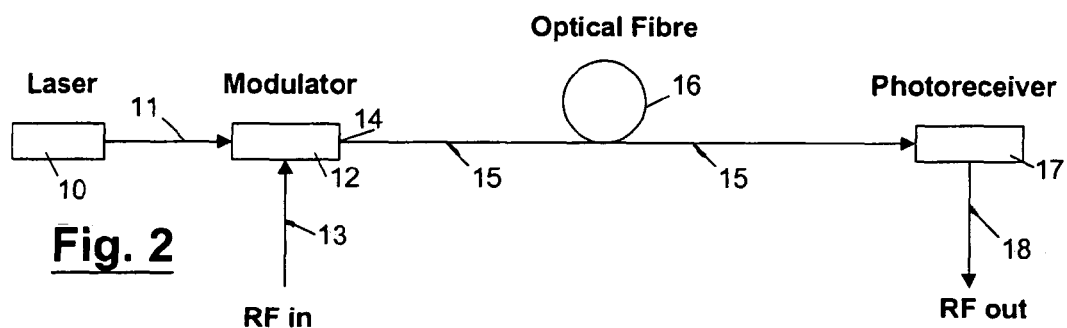
FIG. 2 is a schematic diagram of a system including an optical delay line that may be used for false target generation or range calibration.

A system for use in false target generation is shown in FIG. 2. As can be seen, a laser 10 is used as a light source producing a constant intensity optical signal 11. This optical signal 11 is transmitted to a modulator 12 by an optical fibre. A detected RF radar signal is recorded as an electrical input signal 13 and is fed into the modulator 12. The modulator 12 modulates the intensity of the optical signal 11 to produce a modulated optical signal 14 with an intensity variation proportional to the voltage variation of the electrical input signal 13. This can be done using a Mach-Zehnder modulator, for example.

The modulated optical signal 14 is passed down an optical fibre 15. The length of the optical fibre 15 is chosen to produce an optical delay line giving the required delay time. For the sake of compactness, the majority of the length of the optical fibre 15 is wound into a many-turn coil 16. The modulated optical signal 14 is passed out of the optical fibre 15 to a photoreceiver 17 which produces an electrical output signal 18 whose power varies in proportion to the intensity of the modulated optical signal 14. The electrical output signal 18 may then be used to produce an RF radar signal.

For the sake of simplicity, only a single delay line is shown in FIG. 2. In practice, many optical fibres would link modulator 12 to photoreceiver 17 to create optical paths of differing lengths. The optical fibres can be linked via optical switches, as is known in the art, to allow selection of an appropriate optical path. Moreover, the optical fibres and switches may be arranged in parallel or in series and light may be recirculated through an optical fibre more than once to give a desired time delay or to simulate multiple targets. In addition, a signal may be split with the components being fed through different optical paths before being recombined to simulate a complex multi-reflected signal.

Figure 3:
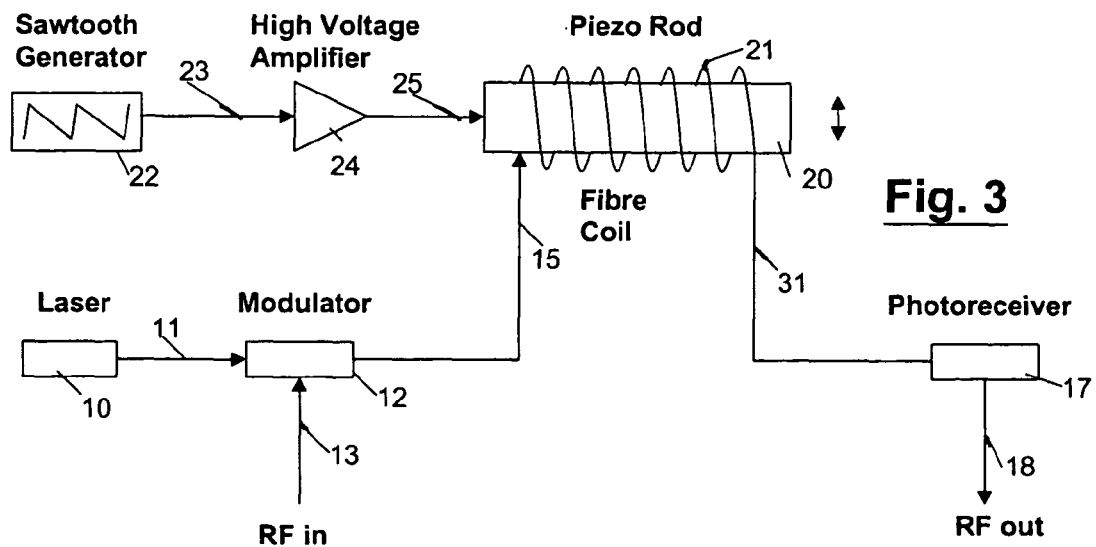
FIG. 3 is a schematic diagram of a system including an optical delay line according to the present invention.

FIG. 3 is a schematic diagram of a system including an optical delay line according to the present invention. As will be immediately evident, several of the elements of FIG. 2 are common to FIG. 3; like reference numerals have been used for like elements and the like elements will not be described again to avoid repetition. However, it should be noted that as for FIG. 2, only one optical delay line is shown for simplicity's sake although it will be readily understood that most systems are likely to have multiple delay lines linked as discussed above with reference to FIG. 2.

Rather than the optical fibre 15 being wound into an unsupported coil 16 as shown in FIG. 2, the optical fibre 15 is wound around the curved outer surface of a cylindrical piezoelectric transducer 20 under slight tension to form a coil 21. To improve legibility, the optical fibre 15 of FIG. 3 is shown loosely wound around the piezoelectric transducer 20 with only seven turns. In practice, the optical fibre 15 will be wound snugly around the piezoelectric transducer 20 and adhered thereto with typically 80 to 100 turns. This arrangement is better reflected in the perspective view of FIG. 4.

The system also comprises a sawtooth generator 22 for producing an electrical sawtooth signal 23 with a sawtooth variation in voltage. This sawtooth signal 23 is amplified in a high voltage amplifier 24 and the amplified sawtooth signal 25 is applied across the piezoelectric transducer 20, thereby causing the piezoelectric transducer 20 to expand and contract. In this embodiment, as the voltage of the amplified electrical signal 25 rises linearly, there is a linear expansion in the circumference of the piezoelectric transducer 20 which then contracts as the amplified electrical signal 25 falls. As the coil 21 of optical fibre 15 is bonded to the piezoelectric transducer 20, the length of the optical fibre 15 expands and contracts as the piezoelectric transducer 20 expands and contracts.

Figure 4:
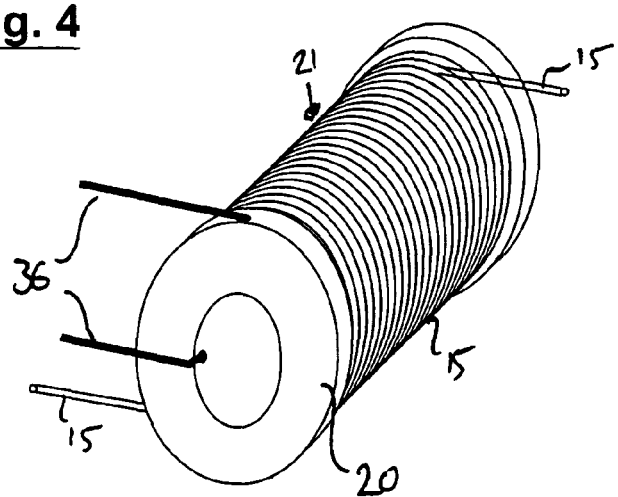
FIG. 4 is a perspective view of an optical fibre wound around a former.

As can be seen best from FIG. 4, the optical fibre 15 is wound tightly around substantially the entire length of the piezoelectric transducer 20. The piezoelectric transducer 20 is typically 10-30 mm long, with an external diameter of about 20 mm and an internal diameter of about 16 mm. Type Pz27 (NAVY II) piezoelectric material, obtainable from PZTech ApS of Denmark, is currently preferred. If the optical fibre 15 is not wound around the piezoelectric transducer 20 tightly enough, there will be slack in the coil 21 and expansion of the optical fibre 15 will not be instantaneous upon expansion of the piezoelectric transducer 20 as the turns in the coil 21 will merely tighten instead. Conversely, winding the optical fibre 15 too tightly risks breaking the optical fibre 15 or adversely affecting its optical transmission characteristics. Kinks in the wound optical fibre 15 should be avoided as they will lead to signal attenuation.

Gyroscope optical fibres are preferred as they are flexible, stretchable and although having slightly higher attenuation characteristics when run straight, they have relatively good attenuation characteristics when coiled. An example is type SM1500 optical fibre obtainable from Fibercore Ltd of Epsilon House, Enterprise Road, Chilworth Science Park, Southampton, N.H. The optical fibre 15 is of monomode type and preferably has a polyimide coating to prevent compression in the coating. However, other types of optical fibre could be used. The optical fibre 15 may be adhered to the piezoelectric transducer 20 using commonly available adhesives such as araldite (RTM) or other two-part epoxies.

Voltages of typically 50-250 V are applied to the piezoelectric transducer 20 to achieve the required expansion via electrodes 36.

Figure 5:
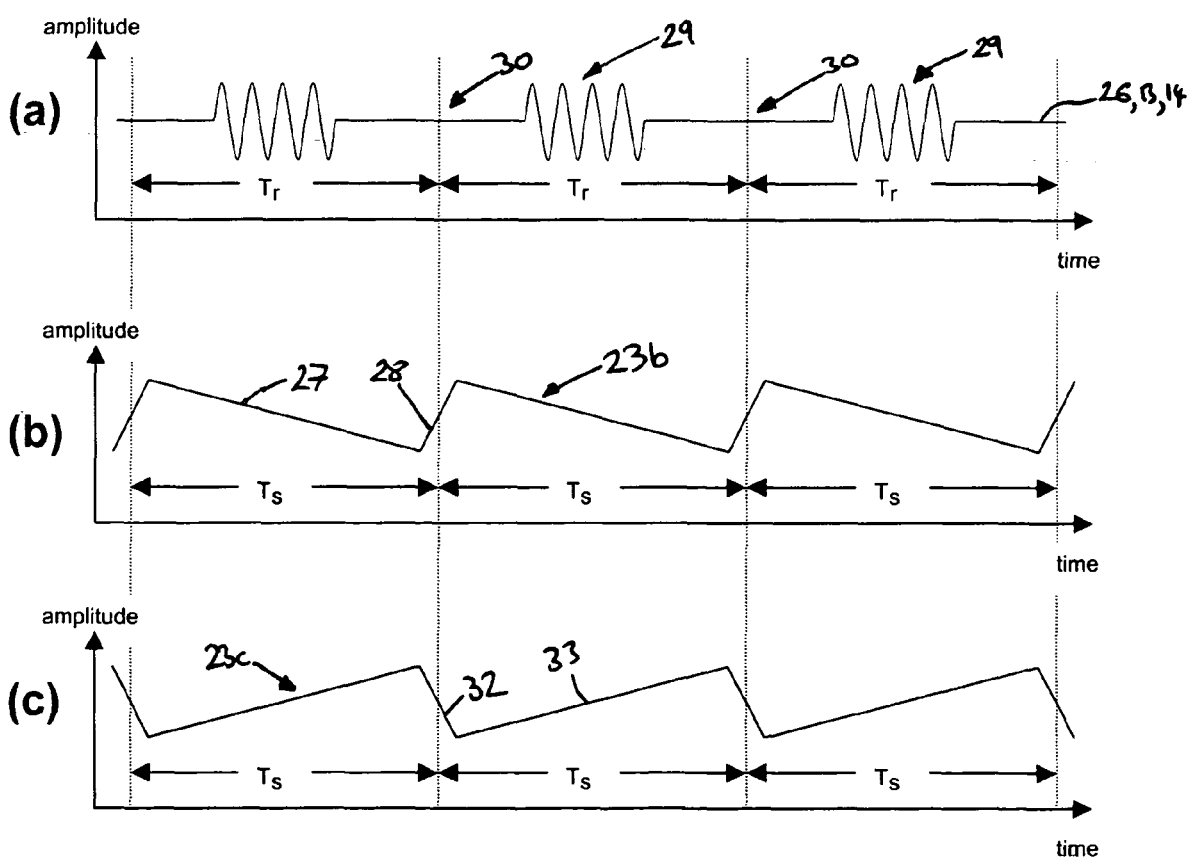
FIG. 5 shows a first typical incident radar signal and preferred sawtooth signals generated to control a piezoelectric transducer using a common time axis (abscissa) to show their synchronisation.

Operation of the system will now be described, with particular reference to FIGS. 5 and 6. FIG. 5a illustrates a situation where a pulsed incident radar signal 26 with a repetition period $T_r$ has been detected as an electrical input signal 13. The electrical input signal 13 is fed to the modulator 12 to produce an intensity-modulated optical signal 14 with the same repetition period $T_r$ which is passed down the optical fibre 15 as described previously. In addition to passing the electrical input signal 13 to the modulator 12, it is also fed to the sawtooth generator 22 (connection not shown in FIG. 3) where it is used to synchronise the timing of the sawtooth signal 23 that the sawtooth generator 22 produces to the repetition period $T_r$ of the modulated optical signal 14. Preferred timing relationships are illustrated in FIGS. 5(b) and (c).

FIG. 5(b) shows that a sawtooth signal 23b is generated with a repetition period $T_s$ to match the repetition period $T_r$ of the electrical input signal 13. Moreover, each period of the sawtooth signal 23b has a slowly decreasing portion 27 and a rapidly increasing portion 28: it will be seen that both the rise and fall are linear. Moreover, the sawtooth signal 23b is timed such that each decreasing portion 27 coincides with a pulse 29 of the modulated optical signal 14 passing through the coil 21 of optical fibre 15 and each increasing portion 28 coincides with a gap 30 between pulses 29 passing through the coil 21. Techniques for achieving this synchronisation are well known in the art. It will be remembered that the sawtooth signal 23b is a voltage-varying signal and is applied across the piezoelectric transducer 20. Hence, the rapidly increasing portion 28 that is applied to the piezoelectric transducer 20 during passage of a gap 30 between pulses 29 causes the piezoelectric transducer 20 to expand and hence the optical fibre 15 to stretch and lengthen. As a pulse 29 passes through the optical fibre 15, the slowly decreasing portion 27 applied to the piezoelectric transducer 20 causes the piezoelectric transducer 20 to contract slowly and hence the optical fibre 15 to relax and shorten to decrease the effective time delay.

Therefore, the optical path length through the optical fibre 15 shortens as a pulse 29 passes therethrough causing the frequency of the oscillating signal within the pulse 29 to increase. Moreover, as the decreasing portion 27 occupies substantially all of a period $T_r$, the optical fibre 15 will be getting shorter for substantially all of the passage of the gaps 30 between pulses 29 so that the frequency of the pulses 29 themselves will also increase. As the sawtooth signal 23b varies monotonously from one period $T_s$ to the next, the same frequency shift is applied from one period $T_r$ to the next. In this way, a constant Doppler shift is applied to the modulated optical signal 14 to produce a shifted optical signal 31.

This shifted optical signal 31 is passed to a photoreceiver 17 to produce an electrical output signal 18 which is used to transmit a delayed "reflected" radar signal as discussed above with reference to FIG. 2. The radar signal will also carry the Doppler shift, and so will appear to have been reflected from an approaching object (as the frequency was shortened due to the decreasing optical path length through the optical fibre 15).

FIG. 5(c) broadly corresponds to FIG. 5(b), but here an alternative sawtooth signal 23c is used. In the sawtooth signal 23c the increasing and decreasing portions have been inverted to give a rapidly decreasing portion 32 and a slowly increasing portion 33. It will be readily appreciated that using the sawtooth signal 23c in the same manner as described for the sawtooth signal 23b will lead to: (i) the optical fibre 15 progressively stretching during substantially all of each period $T_r$ of passage of the modulated optical signal 14 through optical fibre 15, and (ii) to the optical fibre 15 being rapidly relaxed to its initial short length for a small time during passage of a gap 30 between pulses 29. In this way, the frequency of the signal within the pulses 29 will be increased, applying a Doppler shift to give the appearance of a retreating object.

Whilst the sawtooth signals 23b and 23c of FIGS. 5(b) and 5(c) vary uniformly from one period $T_s$ to the next to simulate an object with uniform velocity, the rate of rise or fall of the sawtooth signal 23b,c applied to the piezoelectric transducer 20 may be progressively increased or decreased to give the illusion of an accelerating or decelerating object. This may be achieved by varying the amplitude of the sawtooth signals 23b, 23c.

Figure 6:
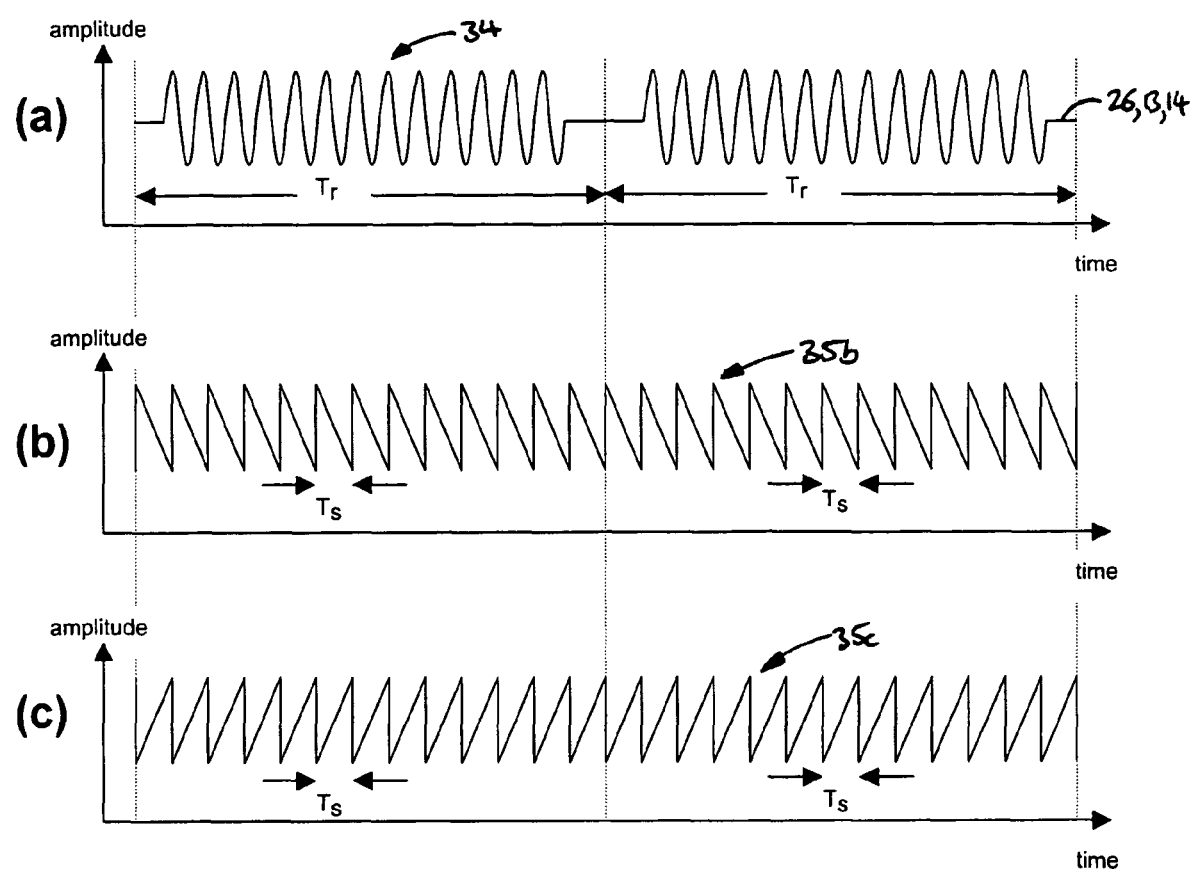
FIG. 6 shows a second typical incident radar signal and preformed sawtooth signals generated to control a piezoelectric transducer using a common time axis (abscissa) to show their synchronisation.

FIG. 6 illustrates a situation where the duration of a pulse 34 is such that the optical fibre 15 cannot be stretched or relaxed at the desired rate for that duration because the piezoelectric transducer 20 cannot be expanded sufficiently or because the optical fibre 15 cannot tolerate the required stretching. In this situation, the repetition period $T_s$ of the sawtooth signal 35 is made much shorter than the repetition period $T_r$ of the radar signal 26 (and, hence, the repetition period $T_r$ of the electrical input signal 13 and the modulated optical signal 14). As before, the sawtooth signal 35b,c comprises a shorter increase portion than decrease portion for signal 35b, and vice versa for signal 35c. Hence, the modulated optical signal 14 "sees" an optical path length that is either increasing or decreasing for substantially its whole passage through the optical fibre and will receive a corresponding Doppler shift. Whilst an undesired Doppler shift will be applied to the modulated optical signal 14 during the short reset periods, the short time of the reset periods (typically 1 µs to 10 µs) ensures that this Doppler shift is unlikely to be detected by a radar station. Comparing FIGS. 6b and 6c with FIGS. 5b and 5c, it will be appreciated that the sawtooth signal 35b produces an apparent approaching object and the sawtooth signal 35c produces an apparent retreating object.

Rather than continuously driving the piezoelectric transducer 20 with the sawtooth signal 35b,c, it may not be driven during the inter-pulse period of the radar signal 26 to extend the lifetime of the piezoelectric transducer 20. This can easily be achieved by the sawtooth signals 35b,c only having a sawtooth shape co-incident with the pulses of the radar signal 26 and a steady signal elsewhere. Of course, this mode of operation having a sawtooth shape co-incident only with the pulses of the radar signal 26 may also be employed in the embodiment show in FIG. 5.

It will be appreciated that many variations to the above embodiments are possible without departing from the scope of invention.

For example, whilst both embodiments described have optical fibres that are stretched and relaxed, this is not necessary. Instead an optical fibre with one or more air gaps in the optical path could be used. Their length could easily be altered by adjusting the separation of the ends of the optical fibre. To reduce losses, graded index (GRIN) lenses could be used to collimate the beam from the optical fibres. Alternatively, rather than adjusting the optical path length, an optical fibre of fixed length could be illuminated with uv light of varying wavelength to alter the refractive index profile of the optical fibre. A further alternative for creating an effective change in the refractive index of an optical fibre is to transmit light from a wavelength-tuneable laser down an optical delay line comprising a dispersive optical fibre.

FIG. 5 shows the case of a radar signal 26 with relatively high duty factor. However, it is common for radar signals of far smaller duty cycle to be employed, e.g. about 10%. In this case, the pulses 29 of the radar signal 26 occupy only a small fraction of the repetition period $T_r$. Accordingly, the decreasing portion 27 of FIG. 5(b) and the increasing portion 33 of FIG. 5(c) may be much shorter, such that the remaining increasing portion 28 and decreasing portion 32 respectively can be made much wider, even to occupy the majority of their respective repetition periods $T_r$. In general, the relative widths of increasing portions 28, 33 and decreasing portions 27, 32 may be varied freely according to the need imposed by the radar signal 26. In addition, steady portions (i.e. of flat shade) may be employed between the increasing portions 28, 33 and decreasing portions 27, 32.

In addition, whilst a piezoelectric former of cylindrical shape has been shown in the specific embodiments, other shapes are possible as will be appreciated by the skilled reader. To avoid tight bends in an optical fibre, formers of smoothly varying cross-section such as circles and ellipses are preferred although any cross-section is possible including squares, rectangles or regular polygons.

The invention claimed is:

1. A method of applying a Doppler shift to an optical signal as it passes through an optical delay line, comprising the step of progressively altering a property of the optical delay line during passage of the optical signal therethrough such that the time taken for the optical signal to pass therethrough is progressively lengthened or progressively shortened for successive portions of the optical signal.

2. A method according to claim 1, comprising progressively increasing or progressively decreasing the effective refractive index of the optical delay line.

3. A method according to claim 1, comprising progressively lengthening or progressively shortening the optical path length of the optical delay line.

4. A method according to claim 3, wherein the optical delay line comprises a stretchable optical fibre, the method comprising the step of progressively stretching or progressively relaxing the optical fibre during passage of the optical signal therethrough.

5. A method according to claim 4, comprising either only progressively stretching or only progressively relaxing the optical fibre during passage of a pulse of a pulsed optical signal.

6. A method according to claim 5, comprising the step of stretching and relaxing the optical fibre periodically, the length of each period being equal to or a multiple or sub-multiple of the repetition period of the pulsed optical signal.

7. A method according to claim 6, comprising the step of applying a varying voltage signal to a piezoelectric transducer with which the optical fibre is associated thereby to stretch or relax the optical fibre.

8. A method according to claim 7, comprising the step of applying a sawtooth shaped signal to the piezoelectric transducer.

9. A method according to claim 8, comprising the step of arranging the repetition period of the sawtooth to be equal to or a multiple or sub-multiple of the repetition period of the pulsed optical signal.

10. An optical delay line for applying a Doppler shift to an optical signal as it passes therethrough, the optical delay line comprising an optical path; frequency shifting means for altering a property of the optical path during passage of the optical signal along the optical path, such that the time taken for the optical signal to pass along the optical path is progressively lengthened or progressively shortened for successive portions of the optical signal; and timing means operable to synchronise operation of the frequency shifting means to the passage of the optical signal through the optical path.

11. An optical delay line according to claim 10, wherein the frequency shifting means are operable progressively to increase or progressively to decrease the average refractive index of the optical path.

12. An optical delay line according to claim 10, wherein the frequency shifting means are operable progressively to lengthen or progressively to shorten the optical path.

13. An optical delay line according to claim 12, wherein the optical path comprises a stretchable optical fibre and the frequency shifting means comprise stretching means operable progressively to stretch or progressively to relax the optical fibre.

14. An optical delay line according to claim 13, wherein the timing means are operable to synchronise stretching of the optical fibre to the pulses of a pulsed signal passing through the optical fibre.

15. An optical delay line according to claim 14, wherein the timing means is operable to generate a timing waveform, the timing waveform causing the optical fibre to be stretched and relaxed periodically.

16. An optical delay line according to claim 15, wherein the timing means is operable to generate a timing waveform that causes the optical fibre to stretch only or to relax only during passage of a pulse through the optical fibre.

17. An optical delay line according to claim 16, wherein the timing means is operable to produce a timing waveform with a repetition period equal to or a multiple or sub-multiple of the repetition period of the pulsed signal.

18. An optical delay line according to any of claims 13 to 17, wherein the stretching means comprises a piezoelectric transducer operable to stretch the optical fibre.

19. An optical delay line according to claim 18, wherein the optical fibre is wound around the piezoelectric transducer.

20. An optical delay line according to claim 19, wherein the optical fibre is wound onto a former, the piezoelectric transducer being operable to vary the dimensions of the former.

21. An optical delay line according to claim 19, wherein the optical fibre is wound around a substantially cylindrical portion of the piezoelectric transducer or former.

22. An optical delay line according to claim 21, wherein the cylindrical portion is hollow.

23. A system comprising an optical source for generating an optical signal, a modulator for modulating the intensity of the optical signal according to an electrical input signal, an optical delay line according to any of claims 10 to 17 for receiving the modulated optical signal and imposing a Doppler shift thereto and a photoreceiver for converting the modulated and shifted optical signal to an electrical output signal.

24. A system according to claim 23, wherein the timing means is a sawtooth generator operable to produce a timing waveform with a sawtooth of varying electrical potential thereby to cause expansion and contraction of the piezoelectric transducer.

* * * * *